United States Patent
Vacanti

(10) Patent No.: US 10,274,596 B2
(45) Date of Patent: Apr. 30, 2019

(54) METHOD AND SYSTEM FOR FMCW RADAR ALTIMETER SYSTEM HEIGHT MEASUREMENT RESOLUTION IMPROVEMENT

(71) Applicant: Honeywell International Inc., Morris Plains, NJ (US)

(72) Inventor: David C. Vacanti, Renton, WA (US)

(73) Assignee: Honeywell International Inc., Morris Plains, NJ (US)

( * ) Notice: Subject to any disclaimer, the term of this patent is extended or adjusted under 35 U.S.C. 154(b) by 583 days.

(21) Appl. No.: 15/048,819

(22) Filed: Feb. 19, 2016

(65) Prior Publication Data

US 2017/0242118 A1    Aug. 24, 2017

(51) Int. Cl.
G01S 13/88    (2006.01)
G01S 13/34    (2006.01)
G01S 7/35     (2006.01)

(52) U.S. Cl.
CPC .......... G01S 13/882 (2013.01); G01S 13/343 (2013.01); *G01S 2007/356* (2013.01)

(58) Field of Classification Search
CPC . G01S 13/882; G01S 13/343; G01S 2007/356
See application file for complete search history.

(56) References Cited

U.S. PATENT DOCUMENTS

| | | | |
|---|---|---|---|
| 3,719,942 A | 3/1973 | Herman et al. | |
| 3,943,346 A | 3/1976 | Urkowitz et al. | |
| 5,257,211 A | 10/1993 | Noga | |
| 5,481,270 A | 1/1996 | Urkowitz et al. | |
| 5,646,623 A | 7/1997 | Walters et al. | |
| 6,484,112 B1 | 11/2002 | Scheppach | |
| 6,633,253 B2 * | 10/2003 | Cataldo | G01S 13/5244 342/160 |
| 7,825,851 B2 | 11/2010 | Vacanti | |

(Continued)

OTHER PUBLICATIONS

Naidu et al., "A Comparative Analysis of Algorithms for Determining the Peak Position of a Stripe to Sub-pixel Accuracy", "Proceedings of the British Machine Vision Conference, organised for the British Machine Vision Association by the Turing Institute 2426 Sep. 1991", , pp. 217-225.

(Continued)

*Primary Examiner* — Matthew M Barker
(74) *Attorney, Agent, or Firm* — Fogg & Powers LLC

(57) ABSTRACT

A method of improving height measurement resolution for a radar system is provided. The method includes periodically generating, at a FFT processor, a set of FFT bins across a frequency range based on a periodic ramping of a FMCW radar signal from a first frequency to a second frequency; selecting a subset of bins from at least one set of FFT bins by implementing a leading-edge-tracking algorithm by at least one processor; implementing a second algorithm on the selected subset of bins to determine a power ratio between the leading edge tracked bin and the remaining bins in the selected subset of bins to determine an interpolated bin number within the selected subset of bins; and determining an approximate distance to the target based on the interpolated bin number within the selected subset of bins. The sets of FFT bins are indicative of a respective plurality of distances.

20 Claims, 6 Drawing Sheets

(56) References Cited

U.S. PATENT DOCUMENTS

| | | |
|---|---|---|
| 7,894,779 B2 | 2/2011 | Meiyappan et al. |
| 9,081,094 B2 | 7/2015 | Holt |
| 2013/0194128 A1 | 8/2013 | Van Der Merwe |
| 2013/0214963 A1 | 8/2013 | Vacanti |
| 2015/0084808 A1 | 3/2015 | Vacanti |
| 2015/0323660 A1* | 11/2015 | Hampikian ............. G01S 13/58 342/109 |
| 2018/0074168 A1* | 3/2018 | Subburaj ................. G01S 7/038 |

OTHER PUBLICATIONS

European Patent Office, "Extended European Search Report for EP Application No. 17153153.6", "Foreign Counterpart to U.S. Appl. No. 15/048,819", dated Jul. 24, 2017, pp. 1-10, Published in: EP.

Brooker et al., "Millimetre Wave Radar Imaging of Mining Vehicles", "2010 European Radar Conference (EURAD)", Sep. 30, 2010, pp. 284-287, Publisher: IEEE, Published in: Piscataway, NJ, USA.

Brooker et al., "Evolution of a Suite of Smart Millimetre Wave Radar Systems for Situational Awareness and Automation in Mines", "International Journal on Smart Sensing and Intelligent Systems, International Journal on Smart Sensing and Intelligent Systems", Jun. 1, 2008, pp. 315-353, vol. 1, No. 2.

Chaudhari et al., "Frequency Estimator to Improve Short Range Accuracy in FMCW Radar", "2015 International Conference on Advances in Computing, Communications and Informatics (ICACCI)", Aug. 1, 2015, pp. 640-644.

\* cited by examiner

METHOD AND SYSTEM FOR FMCW RADAR ALTIMETER SYSTEM HEIGHT MEASUREMENT RESOLUTION IMPROVEMENT

BACKGROUND

A conventional frequency modulated continuous wave (FMCW) radar altimeter system is limited to 200 MHz of operating bandwidth that corresponds to around 3 feet of range resolution. Such an FMCW radar operates by transmitting a chirp signal (frequency sweep) and determining a distance to a target based on the time between transmission of the chirp signal and a reception of a reflection of the chirp signal. The chirp signal is repeated to continually measure distance. The chirp signal can be a linearly increasing ramp, that is repeated, or a linearly increasing ramp followed by a linearly decreasing ramp that is repeated. Such FMCW radars can be used as altimeters in an aircraft or airborne vehicle.

The leading edge detection scheme is known to potentially bias the altitude to a lower value (i.e., a shorter distance) than is correct. For example in the case of a large target, the leading edge detection scheme may track the leading edge range side lobe rather than the actual peak of return.

SUMMARY

The present application relates to a method of improving height measurement resolution for a radar system. The method includes periodically generating, at a fast Fourier transform (FFT) processor, a set of FFT bins across a frequency range based on a periodic ramping of a frequency modulated continuous wave (FMCW) radar signal from a first frequency to a second frequency; selecting a subset of bins from at least one set of FFT bins by implementing a leading-edge-tracking algorithm by at least one processor; implementing a second algorithm on the selected subset of bins to determine a power ratio between the leading edge tracked bin and the remaining bins in the selected subset of bins to determine an interpolated bin number within the selected subset of bins; and determining an approximate distance to the target based on the interpolated bin number within the selected subset of bins. The sets of FFT bins are indicative of a respective plurality of distances. The bins in the selected subset of bins are adjacent to each other. The selected subset of bins are indicative of a respective plurality of approximate distances between the radar system and a target.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
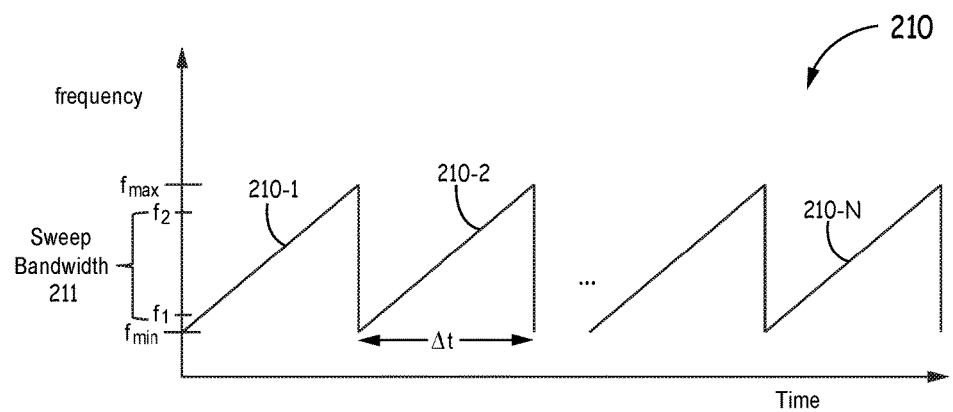
FIG. 1A shows an exemplary FMCW radar signal linearly ramped in frequency versus time in accordance with the present application.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments of systems and methods of improving height measurement resolution for a radar altimeter system described herein generate a plurality of fast Fourier transform (FFT) bins across a frequency range and implement a leading-edge-tracking algorithm, which is a modification of currently available early and late range gate tracking, to find a leading edge bin within subset of four bins. A subset of bins is then selected from the plurality of FFT bins and normalized using power ratios to permit summing to a weighted average. The four bins are chosen to be back weighed toward longer distance in order to move the computed altitude further out. Prior art tracking algorithms look for the peak amplitude or centroid of a range of threshold detected bins rather than attempting to locate a true leading edge. In flight over land masses of natural or manmade materials the detected altitude extent can be very large. Using a peak amplitude response or a center-of-mass/centroid approach to this distributed set of altitude detections creates a bias away from the correct distance (e.g., altitude) which is the leading edge of the entire mass of distributed detections. The leading edge always represents the closest object below an aircraft. Locating this leading edge position is difficult and is the subject of a previous U.S. Pat. No. 7,825,851. The methods described in U.S. Pat. No. 7,825,851 provide an accurate determination of the leading edge. Having found that leading edge position, it is important to realize there is a small bias towards an altitude that is slightly too low. The interpolation method described herein uses the ratio of power among one bin in front of the detected leading edge and two bins after the leading edge bin to determine the true tracked altitude to reduce or eliminate the small bias towards an altitude that is slightly too low.

By using four bins in the selected subset and determining by the power ratio between the leading edge tracked bin and the remaining bins, the problems with the early and late range gate tracking schemes are avoided. The systems and methods described herein determine a more accurate distance to the ground than is possible based on implementing a prior art leading-edge-tracking algorithm with early and late range gate tracking. By implementing a modified leading-edge-tracking algorithm followed by an implementation of a second algorithm that determines the ratio of power among the 4 bins relative to the tracked leading edge bin in order to reduce or eliminate the forward (i.e., too short) bias and the tracked altitude is more accurately determined.

For example, if the peak FFT bin happens to be the tracked leading edge bin and the power in all other bins before and after that bin are virtually excluded from influence in the calculation and the altitude will be that of the tracked leading edge bin. If the tracked bin and the bin following it are of equal amplitude the true altitude is exactly ½ the distance between the two bins. If the peak amplitude is in the $2^{nd}$ bin following the tracked leading edge then the true altitude will be just in front of the peak bin, the position determined by the power ratio between the $4^{th}$ and $3^{rd}$ bin with some contribution from the $2^{nd}$ (tracked bin) and $1^{st}$ bin.

FIG. 1A shows an exemplary FMCW radar signal 210 linearly ramped in frequency versus time in accordance with the present application. During FMCW operation of a radar or radio altimeter, the frequency of the radar signal 210 is repetitively swept with a linear ramp (i.e., repetitive frequency sweeps at a constant rate versus time in either a positive or negative direction). Each frequency sweep is referred to as a frequency chirp. The exemplary ramped segments of FIG. 1A, which are represented generally at 210(1-N), where N is a positive integer, range in frequency from $f_{min}$ to $f_{max}$ and are swept in a positive direction. A portion of the frequencies within a range of frequencies from $f_{min}$ to $f_{max}$ is referred to herein as the sweep bandwidth 211. As shown in FIG. 1A, the sweep bandwidth 211 covers the frequency range from a first frequency ft which is slightly larger than $f_{min}$, to a second frequency $f_2$, which is slightly less than $f_{max}$.

The radar signal 210 sweeps from $f_{min}$ (e.g., 4215 MHz) to $f_{max}$ (e.g., 4385 MHz) over a time Δt. This sweep is repeated during FMCW operation of the altimeter so that the radar signal 210 has a saw-tooth pattern as shown in FIG. 1A. In one implementation of this embodiment, the sweep of the radar signal 210 has a triangle pattern where the transmitted signal 210 sweeps down from $f_{max}$ to $f_{min}$ after sweeping up from $f_{min}$ to $f_{max}$.

Figure 1B:
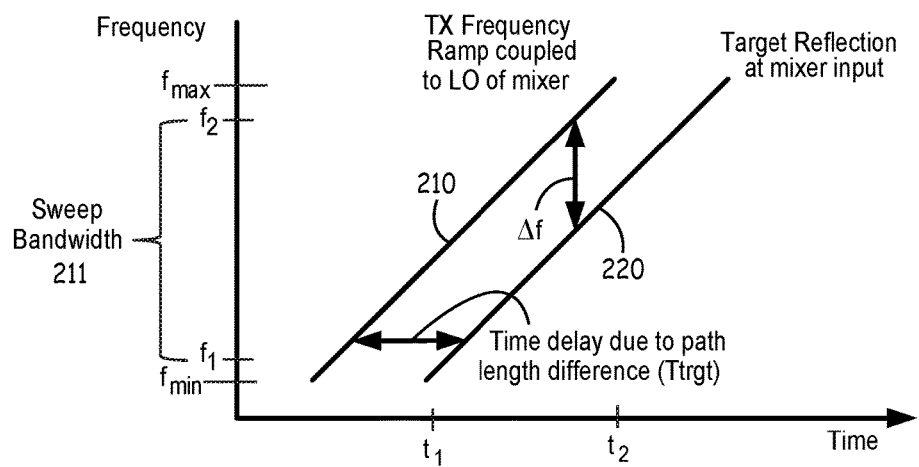
FIG. 1B shows a ramped segment of the exemplary FMCW radar signal of FIG. 1A and an exemplary target-reflected signal in accordance with the present application.
Figure 2:
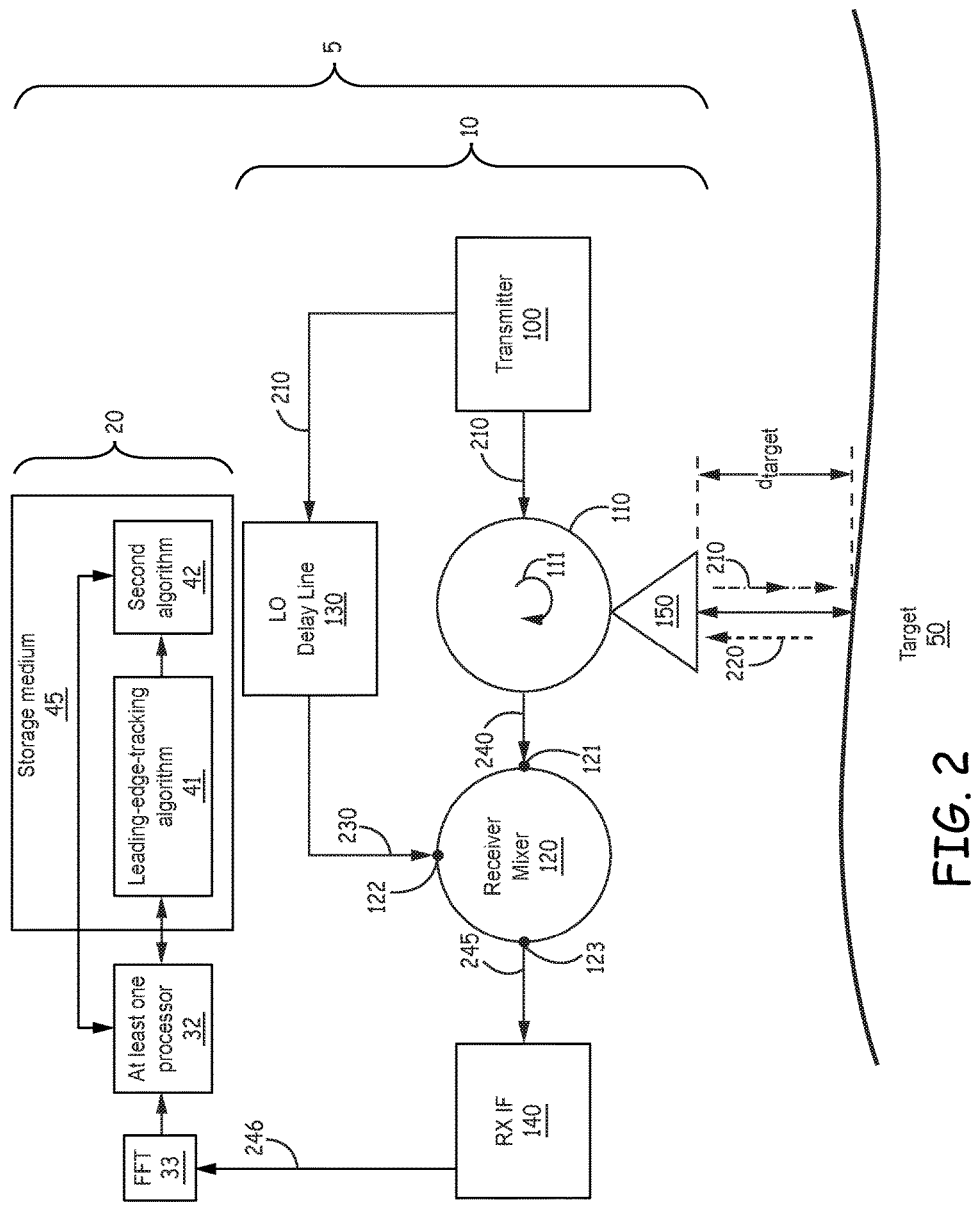
FIG. 2 is a block diagram of one embodiment of a radar altimeter system in accordance with the present application.

FIG. 1B shows a ramped segment of the exemplary FMCW radar signal 210 of FIG. 1A and an exemplary target-reflected signal 220 in accordance with the present application. FIG. 2 is a block diagram of one embodiment of a radar altimeter system 5 in accordance with the present application. The exemplary radar altimeter system 5 includes a radar system 10 and a processing system 20. The exemplary radar system 10 includes a transmitter 100, a transceiver circulator 110, a receiver mixer 120, a local oscillator (LO) delay line 130, a receiver intermediate frequency (IF) module 140, and a single antenna 150. The processing system 20 includes a fast Fourier transform (FFT) processor 33, at least one processor (e.g., digital signal processor) 32, a leading-edge-tracking algorithm 41, and a second algorithm 42. The leading-edge-tracking algorithm 41 and second algorithm 42 are stored in a storage medium 45. The leading-edge-tracking algorithm 41 is also referred to herein as a first algorithm. The second algorithm 42 is also referred to herein as an interpolated-bin-number algorithm since it interpolates a bin number based on a determined power ratio between the leading edge tracked bin and the remaining bins in the selected subset of bins as described below.

In one implementation of this embodiment, the storage medium 45 is a memory in the at least one processor 32. In another implementation of this embodiment, the FFT processor 33 and the at least one processor 32 are a single processor 32. In another implementation of this embodiment, the FFT processor is a digital signal processor (DSP) 33. In yet another implementation of this embodiment, the FFT processor 33 is a field programmable gate array (FPGA) 33.

The receiver mixer 120 includes an antenna-input 121 and a local-oscillator-input 122. The transceiver circulator 110 has a directivity represented generally at 111. In one implementation of this embodiment, the antenna 150 is integrated in a common housing with the transmitter 100, the receiver mixer 120, and the receiver IF module 140. In this case, the antenna 150 is connected closely (e.g., as close as physically possible) to the circulator 110. In another implementation of this embodiment, the antenna 150 is composed of one or more resonant elements and is less than 2 cm (e.g., within 1 to 2 cm) from the circulator 110.

The radar signal 210 is generated at the transmitter 100. The radar signal 210 is directed to the antenna 150 by the transceiver circulator 110. The radar signal 210 is emitted by the antenna 150 and propagates from the antenna 150 to a target 50. At least a portion of the radar signal 210 is reflected by the target 50 as target-reflected signal 220 back to the antenna 150. The target-reflected signal 220 is received at the antenna 150 and propagates through the transceiver circulator 110 to the antenna-input 121 of receiver mixer 120. The radar signal 210 is also directed to the LO delay line 130. LO delay line 130 delays the radar signal 210 and outputs the LO signal 230 to the local-oscillator-input 122 of the receiver mixer 120.

As shown in FIG. 1B, for the range of times between $t_1$ and $t_2$, the frequency of the target-reflected signal 220 input at the antenna-input 121 of the receiver mixer 120 differs from the frequency of the local oscillator signal 230 input at the local-oscillator-input 122 of the receiver mixer 120 by a constant amount (Δf). This frequency difference equals the amount of the frequency sweep that has occurred during the time required for the radar signal 210 to travel the distance from the transmitter to the target and back to the receiver minus the LO delay time. Thus, the distance, $d_{target}$, to the target 50 from the antenna 150 is proportional to the difference frequency Δf. The output from IF-output 123 of the receiver mixer 120 is an intermediate frequency (IF) signal 245 that has a frequency equal to the frequency difference Δf. The receiver intermediate frequency (IF) module 140 processes the IF signals 245 and passes them, as digital output 246, to the processing system 20, which determines the distance, $d_{target}$, to the target 50.

The frequency chirp method described above can be used to determine the distance, $d_{target}$, with a resolution based on the separation of the FFT bins in the altimeter 10. In an example, the FFT bins are about 3 feet apart. This makes the frequency chirp a good means for determining the distance to the target 50 when the target 50 is farther than 3 feet away. In order to achieve resolution smaller than 3 feet and to overcome the problem, in which the leading edge detection scheme tracks a leading edge range side lobe rather than the actual peak of return, the processing system 20 described herein advantageously executes the leading-edge-tracking algorithm 41 and the second algorithm 42 to detect the actual peak of return in order to improve the achieve resolution of about 1 foot.

The Fast Fourier Transform (FFT) processor 33 is configured to perform Fast Fourier Transforms (FFT) and is referred to herein as FFT 33. The FFT 33 receives the digital output 246 from the receiver IF module 140. The FFT 33 periodically computes FFT on the digital output 246 and generates sets of FFT bins across a frequency range between a first frequency $f_1$ at approximately $f_{min}$ to a second frequency $f_2$ at approximately $f_{max}$. The frequency bins of the FFT correspond to incremental altitude bins. FFT 33 outputs the values for each of the bins to the at least one processor 32. In one implementation of this embodiment, the FFT 33 outputs forty bins. In one implementation of this embodiment, the plurality of fast Fourier transform (FFT) bins 500 spans a frequency range between 4215 MHz and 4385 MHz and an associated distance of 123 feet.

Figure 3:
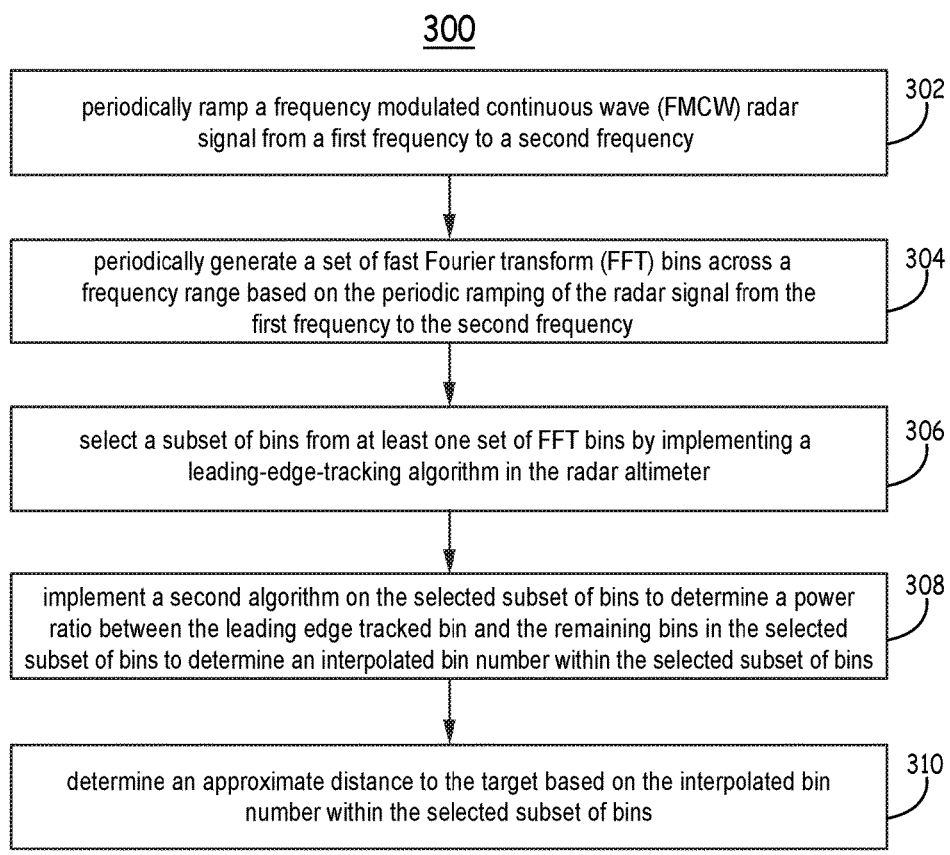
FIG. 3 is a flow diagram of an exemplary method to improve height measurement resolution for a radar system in a radar altimeter system in accordance with the present application.
Figure 4A:
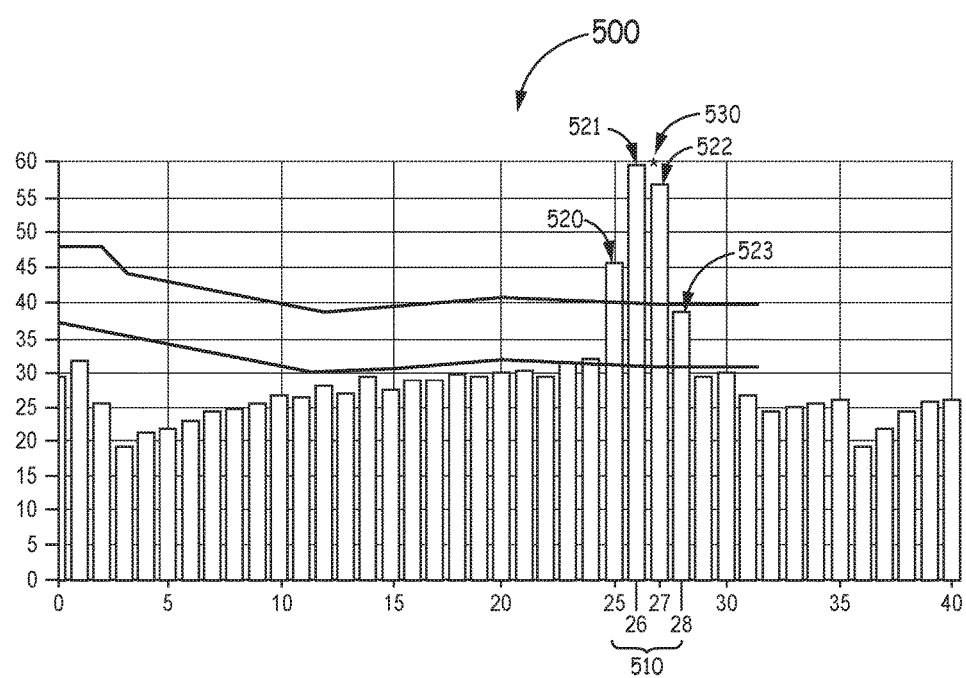
FIG. 4A is an exemplary set of averaged fast Fourier transform (FFT) bins including a preselected number of most recently generated sets of FFT bins in accordance with the present application.
Figure 4B:
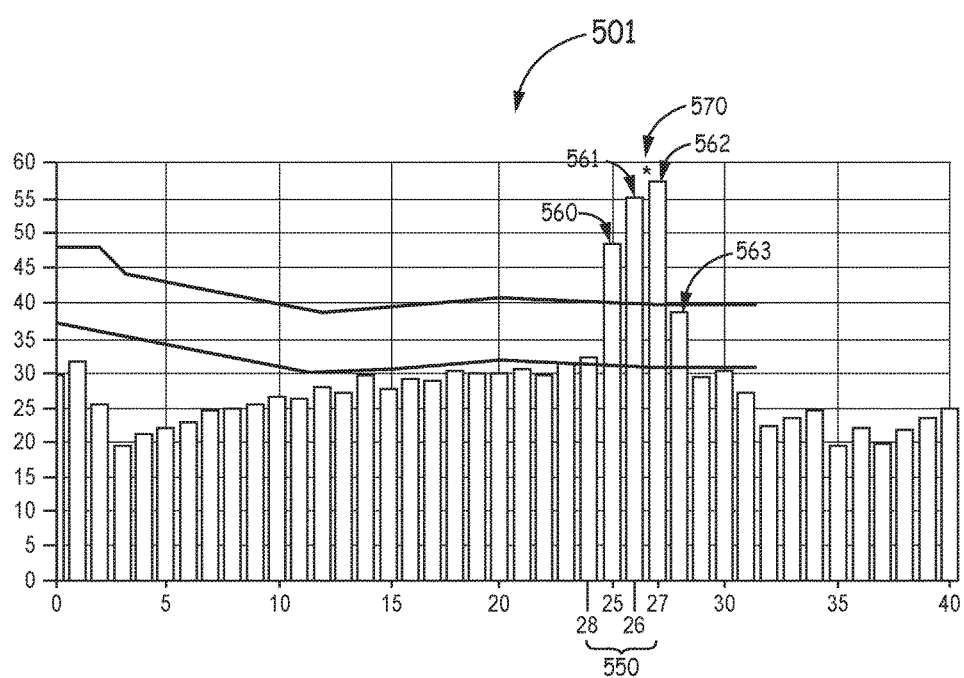
FIG. 4B is an exemplary set of a most recently received set of FFT bins in accordance with the present application.

FIG. 3 is a flow diagram of an exemplary method 300 to improve height measurement resolution for a radar system 10 in a radar altimeter system 5 in accordance with the present application. The method is described with reference to FIGS. 2, 4A, and 4B. FIG. 4A is an exemplary set of averaged fast Fourier transform (FFT) bins 500 including a preselected number of most recently generated sets of FFT bins 500 in accordance with the present application. FIG. 4B is an exemplary set of a most recently received set of FFT bins 501 in accordance with the present application. The plurality of FFT bins 500 and 501 are indicative of a respective plurality of approximate distances. The amount of time between transmission of a radar signal 210 from the radar system 10 and reception of a reflection of the radar signal 220 is correlated to the respective plurality of approximate distances. The most accurate of the approximate distances between the radar system 10 and a target 50 is associated with an interpolated bin number represented generally at 530 of the subset 510 of bins 520-523. Specifically, the interpolated bin number 530 of the subset 510 of bins 520-523 is more accurate than either of the integral number of the bins on either side of the interpolated bin number 530 of the subset 510 of bins 520-523. For example, if the interpolated bin number 530 of the subset of bins is 26.16, then the distance associated with this bin value 26.16 is more accurate than the distance associated with bin 26 and is more accurate than the distance associated with bin 27. Likewise, after an approximate distance $d_{target}$ to the target 50 based on the interpolated bin number 530 of the selected subset 510 of bins 520-523 (FIG. 4A) is updated, the most accurate of the approximate distances between the radar system 10 and the target 50 is associated with an interpolated bin number 570 of the subset 550 of bins 560-563 as shown in FIG. 4B.

At block 302, the FMCW radar signal 210 is periodically ramped from the first frequency from $f_{min}$, to the second frequency $f_{max}$ and the reflection 220 of the ramped FMCW radar signal 210 is received from the first frequency from $f_{min}$ to the second frequency $f_{max}$.

At block 304, a set of FFT bins is periodically generated across the frequency range $f_{min}$ to $f_{max}$ (or the sweep bandwidth $f_2$ to $f_2$) based on the periodic ramping of the FMCW radar signal 210 from a first frequency $f_{min}$ to a second frequency $f_{max}$. The FFT processor 33 periodically generates the set of FFT bins across a frequency range based on the received reflection of the FMCW radar signal 210.

At block 306, a subset of bins 510 is selected from the set of FFT bins 500 by implementing the leading-edge-tracking algorithm 41. The at least one processor 32 executes the leading-edge-tracking algorithm 41. The bins 520-523 in the selected subset 510 of bins 520-523 are adjacent to each other. The selected subset 510 of bins 520-523 is indicative of a respective plurality of approximate distances between the radar system 10 and a target 50 (FIG. 2). In one implementation of this embodiment, selected subset 510 of bins 520-523 include a subset of four bins from the averaged set of FFT bins 500. As shown in FIG. 4A, the selected subset 510 of bins 520-523 includes the four bins numbered 25-28 on the horizontal axis. The vertical axis of the plot of the averaged set of FFT bins 500 is the averaged power value (i.e., amplitude) of the bins.

When the radar altimeter system 5 is initially implemented to improve the height measurement resolution for a radar system 10 in the radar altimeter system 5, the leading-edge-tracking algorithm 41 is implemented on a preselected number (e.g., forty) of the most recently generated sets of FFT bins. After the leading-edge-tracking algorithm 41 has determined the leading edge bin for the preselected number of most recently generated sets of FFT bins, a leading edge bin is selected based on which bin is selected the majority of times in that preselected number. This leading edge bin is referred to herein as an initial-leading-edge bin. For example, if the leading-edge-tracking algorithm is implemented on forty (40) sequentially generated sets of FFT bins and bin 20 is the leading edge bin 7 times, bin 22 is the leading edge bin 18 times, and bin 23 is the leading edge bin 15 times, then bin 22, having the majority of hits as leading edge bin, is the initial-leading-edge bin for the 40 most recently generated sets of FFT bins.

After the preselected numbers of initial runs of the leading-edge-tracking algorithm 41 are completed and the initial-leading-edge bin has been determined based on a majority of hits as leading edge bin, the preselected number of most recently generated sets of FFT bins are averaged to form an averaged set of FFT bins 500 (FIG. 4A). In one implementation of this embodiment, the power values in bins in forty most recently generated sets of FFT bins are averaged to form the averaged set of FFT bins 500 (FIG. 4A).

The preselected number of most recently generated sets of FFT bins are averaged for each respective bin. For example, the power values in bin 1 for the preselected number (e.g., 40) of most recently generated sets of FFT bins are averaged to form the averaged power value for bin 1. Likewise, the power values in bin 2 for the preselected number (e.g., 40) of most recently generated sets of FFT bins are averaged to form the averaged power value for bin 2. After this initial averaging is completed no additional averaging is required.

Additionally, after the preselected numbers of initial runs of the leading-edge-tracking algorithm 41 are completed and the initial-leading-edge bin is determined based on a majority of hits as leading edge bin, the next-leading-edge bin is selected for the next (single) most recently generated set of FFT bins. Thus, after the initial preselected runs, the leading-edge-tracking algorithm 41 functions as a shift register by inputting a most recently received set of FFT bins 501 (FIG. 4B) to the preselected number of most recently generated sets of FFT bins and removing the oldest set of FFT bins from the preselected number of most recently generated sets of FFT bins. Then the current amplitudes of the newest FFT are used for the amplitude values. In this manner, the leading-edge-tracking algorithm 41 acts as shift register with one new FFT added and the oldest removed to create a valid frame set.

In order to clearly describe this flow, the processes in blocks 306, 308, and 310 of method 300 are described: 1) for the initial-leading-edge bin and the averaged set of FFT bins 500 (FIG. 4A); and 2) for the next iterations when the processor is operating with a next-leading-edge bin and the next most recently generated set of FFT bins 501 (FIG. 4B).

Once the initial-leading-edge bin 521 is determined, the subset of bins is selected (block 306). The leading-edge-tracking algorithm 41 selects a bin preceding the initial-leading-edge bin 521 to be an early bin 250 (shown as bin number 25 in FIG. 4A) in the averaged subset of bins 500. Then the leading-edge-tracking algorithm 41 selects a bin following the initial-leading-edge bin 521 to be a first-late bin 522 (shown as bin number 27 in FIG. 4A) in the averaged subset of bins 500. Then the leading-edge-tracking algorithm 41 selects a bin following the first-late bin 522 to be a second-late bin 523 (shown as bin number 28 in FIG. 4A) in the averaged subset of bins 500.

In one implementation of this embodiment, the at least one processor 32 executes algorithms to normalize and scale the power values in the early bin 520, the initial-leading-edge bin 521, the first-late bin 522, and the second-late bin 523. In one implementation of this embodiment, this process is implemented as follows. The at least one processor 32 (also referred to herein a "processor 32") determines which of the early bin 250, the initial-leading-edge bin 521, the first-late bin 522, and the second-late bin 523 has a highest power value. The processor 32 sets the power value of the bin 520, 521, 522, or 523 with the highest power value as a peak power value. The processor 32 computes an antilog of a power ratio of the early bin 250, the initial-leading-edge bin 521, the first-late bin 522, and the second-late bin 523, which are each normalized relative to the peak power value to determine a power ratio value for each bin 520-523 in the selected subset 510 of bins 520-523. The processor 32 sums the power ratio values of the early bin 520, the initial-leading-edge bin 521, the first-late bin 522, and the second-late bin 523 to form a sum of the power ratio values (SumPR) for the bins in the selected subset 510 of bins 520-523.

At block 308, the processor 32 implements the second algorithm 42 on the selected subset of bins to determine a power ratio between the leading edge tracked bin and the remaining bins in the selected subset of bins to determine an interpolated bin number within the selected subset of bins. For the first run through method 300, the processor 32 implements the second algorithm 42 on the early bin 520, the initial-leading-edge bin 521, the first-late bin 522, and the second-late bin 523 to determine the interpolated bin number 530 of the early bin 520, the initial-leading-edge bin 521, the first-late bin 522, and the second-late bin 523. The processor 32 implements the second algorithm 42 on the selected subset 510 of bins 520-523 to determine the interpolated bin number 530 of the selected subset 510 of bins 25-28 by: 1) forming a normalized power ratio for each of the selected bins; 2) forming a normalized scaled value for each of the selected bins by multiplying a bin number for the respective one of the selected bins by the normalized power ratio for the respective one of the selected bins; and 3) summing the normalized scaled value for the selected bins to obtain an interpolated bin number of the selected subset 510 of bins 520-523.

The processor 32 normalizes all the power ratios to permit a summing to a weighted average. The processor 32 forms a normalized power ratio for each of the selected bins by computing a ratio of: the power ratio value of the early bin 520 to the sum of the power ratio values SumPR to form a normalized early bin power ratio (NEbPr); the power ratio value of the initial-leading-edge bin 521 to the sum of the power ratio values SumPR to form a normalized initial-leading-edge bin power ratio (NLEbPr); the power ratio value of the first-late bin 522 to the sum of the power ratio values SumPR to form a normalized first-late bin power ratio (NL1bPr); and the power ratio value of the second-late bin 523 to the sum of the power ratio values SumPR to form a normalized second-late bin power ratio (NL2bPr). In this manner, the processor 32 normalizes the bins in the selected subset 510 of bins 520-523.

The processor 32 forms a normalized scaled value for each of the selected bins by multiplying the bin number for the respective one of the selected bins by the normalized power ratio for the respective one of the selected bins and then sums them to determine the interpolated bin number 530.

As shown in FIG. 4A, the early bin 520 is bin number 25 so the normalized early bin power ratio (NEbPr) is multiplied by 25; the initial-leading-edge bin 521 is bin number 26 so the normalized initial-leading-edge bin power ratio (NLEbPr) is multiplied by 26; the first-late bin 522 is bin number 27 so the normalized first-late bin power ratio (NL1bPr) is multiplied by 27; and the second-late bin 523 is bin number 28 so the normalized second-late bin power ratio (NL2bPr) is multiplied by 28. The interpolated bin number 530 is the sum of these values. In the embodiment shown in FIG. 4A, the interpolated bin number 530 is a value between the integers 26 and 27. For example, the interpolated bin number 530 may be 26.5.

At block 310, the processor 32 determines the approximate distance $d_{target}$ to the target 50 (i.e., the distance between the target 50 and the radar system 10) based on the interpolated bin number 530 of the selected subset 510 of bins 25-28 by multiplying the interpolated bin number by a distance-factor per bin to determine the distance $d_{target}$ to the target 50. If the distance-factor per bin is 3.08 feet and the interpolated bin number 530 is 26.5, the distance $d_{target}$ between the target 50 and the radar system 10 is 81.62 feet. In a prior art altimeter, the bin number 26 would have been used to determine the distance between the target and the radar system. The prior art system would determine a distance of 80.08 feet which is 1.54 feet lower than the true altitude.

The flow of method 300 proceeds from block 310 back to block 306 and the process of determining a distance $d_{target}$ to the target 50 is repeated for the next iteration when the processor is operating with a next-leading-edge bin and the next most recently generated set of FFT bins 501 (FIG. 4B). In the next iteration, the next most recently generated set of FFT bins 501 is not averaged with the other previously generated sets of bins, as shown in FIG. 4B. Also, in this next iteration, the next-leading-edge bin is only based on the values in the most recently generated set of FFT bins 501 and is not set by a majority of leading edge bins in a plurality of sets of FFT bins. The processor 32 executes the leading-edge-tracking algorithm 41 on the most recently generated set of FFT bins 501 to determine the next-leading-edge bin 561 (FIG. 4B).

At block 306, a subset of bins 550 is selected from the set of FFT bins 501 by implementing the leading-edge-tracking algorithm 41 (FIG. 4B). The at least one processor 32 executes the leading-edge-tracking algorithm 41. The bins 560-563 in the selected subset 550 of bins 560-563 are adjacent to each other. The selected subset 550 of bins 560-563 is indicative of a respective plurality of approximate distances between the radar system 10 and a target 50 (FIG. 2). In one implementation of this embodiment, selected subset 550 of bins 560-563 include a subset 550 of four bins from the set of FFT bins 501. As shown in FIG. 4B, the selected subset 550 of bins 560-563 includes the four bins numbered 24-27 on the horizontal axis. The vertical axis of the plot of the set of FFT bins 501 is the averaged power value (i.e., amplitude) of the bins.

The leading-edge-tracking algorithm 41 selects an next-leading-edge bin 561 (shown as bin number 25 in FIG. 4B) in the set of FFT bins 501. Then the leading-edge-tracking algorithm 41 selects a bin preceding the next-leading-edge bin 561 to be an early bin 250 (shown as bin number 24 in FIG. 4B) in the averaged subset of bins 501. Then the leading-edge-tracking algorithm 41 selects a bin following the next-leading-edge bin 561 to be a first-late bin 562 (shown as bin number 26 in FIG. 4B) in the subset of bins 501. Then the leading-edge-tracking algorithm 41 selects a bin following the first-late bin 562 to be a second-late bin 563 (shown as bin number 27 in FIG. 4B) in the subset of bins 501.

In one implementation of this embodiment, the at least one processor 32 executes algorithms to normalize and scale the power values in the early bin 560, the next-leading-edge bin 561, the first-late bin 562, and the second-late bin 563. In one implementation of this embodiment, this process is implemented as follows. The processor 32 determines which of the early bin 250, the next-leading-edge bin 561, the first-late bin 562, and the second-late bin 563 has a highest power value. The processor 32 sets the power value of the bin 560, 561, 562, or 563 with the highest power value as a peak power value. The processor 32 computes an antilog of a power ratio of the early bin 250, the next-leading-edge bin 561, the first-late bin 562, and the second-late bin 563, which are each normalized relative to the peak power value to determine a power ratio value for each bin 560-563 in the selected subset 550 of bins 560-563. The processor 32 sums the power ratio values of the early bin 560, the next-leading-edge bin 561, the first-late bin 562, and the second-late bin 563 to form a sum of the power ratio values (SumPR) for the bins in the selected subset 550 of bins 560-563.

At block 308, the processor 32 again implements the second algorithm 42 on the selected subset of bins to determine the power ratio between the leading edge tracked bin and the remaining bins in the selected subset of bins to determine the interpolated bin number within the selected subset of bins. For non-initial runs through method 300, the processor 32 implements the second algorithm 42 on the early bin 560, the next-leading-edge bin 561, the first-late bin 562, and the second-late bin 563 to determine the interpolated bin number 530 of the early bin 560, the next-leading-edge bin 561, the first-late bin 562, and the second-late bin 563. The processor 32 implements the second algorithm 42 on the selected subset 550 of bins 560-563 to determine the interpolated bin number 530 of the selected subset 550 of bins 25-28 by: 1) forming a normalized power ratio for each of the selected bins; 2) forming a normalized scaled value for each of the selected bins by multiplying a bin number for the respective one of the selected bins by the normalized power ratio for the respective one of the selected bins; and 3) summing the normalized scaled value for the selected bins to obtain an interpolated bin number of the selected subset 550 of bins 560-563.

The processor 32 normalizes all the power ratios to permit a summing to a weighted average. The processor 32 forms a normalized power ratio for each of the selected bins by computing a ratio of: the power ratio value of the early bin 560 to the sum of the power ratio values SumPR to form a normalized early bin power ratio (NEbPr); the power ratio value of the next-leading-edge bin 561 to the sum of the power ratio values SumPR to form a normalized initial-leading-edge bin power ratio (NLEbPr); the power ratio value of the first-late bin 562 to the sum of the power ratio values SumPR to form a normalized first-late bin power ratio (NL1bPr); and the power ratio value of the second-late bin 563 to the sum of the power ratio values SumPR to form a normalized second-late bin power ratio (NL2bPr). In this manner, the processor 32 normalizes the bins in the selected subset 550 of bins 560-563.

The processor 32 forms a normalized scaled value for each of the selected bins by multiplying the bin number for the respective one of the selected bins by the normalized power ratio for the respective one of the selected bins and then sums them to determine the interpolated bin number 530.

As shown in FIG. 4B, the early bin 560 is bin number 24 so the normalized early bin power ratio (NEbPr) is multiplied by 24; the next-leading-edge bin 561 is bin number 25 so the normalized initial-leading-edge bin power ratio (NLEbPr) is multiplied by 25; the first-late bin 562 is bin number 26 so the normalized first-late bin power ratio (NL1bPr) is multiplied by 26; and the second-late bin 563 is bin number 27 so the normalized second-late bin power ratio (NL2bPr) is multiplied by 27. The interpolated bin number 530 is the sum of these values. In the embodiment shown in FIG. 4B, the interpolated bin number 530 is a value between the integers 25 and 26. For example, the interpolated bin number 530 may be 25.5.

At block 310, the processor 32 determines the approximate distance $d_{target}$ to the target 50 (i.e., the distance between the target 50 and the radar system 10) based on the interpolated bin number 570 of the selected subset 550 of bins 24-27 comprises multiplying the interpolated bin number by a distance-factor per bin to determine the distance $d_{target}$ to the target 50. If the distance-factor per bin is 3.08 feet and the interpolated bin number 530 is 25.5, the distance $d_{target}$ between the target 50 and the radar system 10 is 78.54 feet. In a prior art altimeter, the bin number 24 (or bin 25) would have been used to determine the distance between the target and the radar system. The prior art system would determine a distance of 73.92 feet (or 77 feet) which is 4.62 feet (or 1.54 feet) lower than the true altitude.

The processes of method 300 continues to flow from block 310 to block 306 and through blocks 308 and 310 (using next-leading-edge bin 561 to find the subset 550 of bins 560-563) until the distance between the vehicle and the target is zero or until the periodic ramping of the frequency m FMCW radar signal of block ends (e.g., the radar altimeter system is turned off).

In this manner, the radar altimeter system 5 offsets any forward bias and has improved height measurement resolution over the prior art altimeters that do not use four bins in the selected subset of bins and that do not implement a second algorithm on the selected subset of bins to determine an interpolated bin number within the selected subset of bins based on a power ratio between the leading edge tracked bin and the remaining bins in the selected subset of bins.

In one implementation, the at least one processor 32 comprises processor support chips and/or system support chips such as micro-processors, application-specific integrated circuits (ASICs), or Field Programmable Gate Arrays (FPGAs). The at least one processor 32 includes or functions with software programs, firmware or other computer readable instructions for carrying out various methods, process tasks, calculations, and control functions, used in the radar altimeter system 5.

These instructions are typically stored on any appropriate computer readable medium used for storage of computer readable instructions or data structures. The computer readable medium can be implemented as any available media that can be accessed by a general purpose or special purpose computer or processor, or any programmable logic device.

Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Example Embodiments

Example 1 includes a method of improving height measurement resolution for a radar system, the method comprising: periodically generating, at a fast Fourier transform (FFT) processor, a set of FFT bins across a frequency range based on a periodic ramping of a frequency modulated continuous wave (FMCW) radar signal from a first frequency to a second frequency, wherein the sets of FFT bins are indicative of a respective plurality of distances; selecting a subset of bins from at least one set of FFT bins by implementing a leading-edge-tracking algorithm by at least one processor, wherein the bins in the selected subset of bins are adjacent to each other, and wherein the selected subset of bins are indicative of a respective plurality of approximate distances between the radar system and a target; implementing a second algorithm on the selected subset of bins to determine a power ratio between the leading edge tracked bin and the remaining bins in the selected subset of bins to determine an interpolated bin number within the selected subset of bins; and determining an approximate distance to the target based on the interpolated bin number within the selected subset of bins.

Example 2 includes the method of Example 1, wherein selecting the subset of bins from the at least one set of FFT bins comprises: implementing the leading-edge-tracking algorithm to select an initial-leading-edge bin, and the method further comprises: averaging power values in respective bins in a preselected number of most recently generated sets of FFT bins to form an averaged set of FFT bins.

Example 3 includes the method of Example 2, wherein averaging the power values in the respective bins in the preselected number of most recently generated sets of FFT bins to form the averaged set of FFT bins comprises: averaging the power values in bins in forty most recently generated sets of FFT bins to form the averaged set of FFT bins; and wherein selecting the subset of bins from the at least one set of FFT bins comprises: selecting a subset of four bins from the averaged set of FFT bins.

Example 4 includes the method of any of Examples 2-3, wherein selecting the subset of bins from the at least one set of FFT bins further comprises: selecting a bin preceding the initial-leading-edge bin to be an early bin in the subset of bins; selecting a bin following the initial-leading-edge bin to be a first-late bin in the subset of bins; and selecting a bin following the first-late bin to be a second-late bin in the subset of bins.

Example 5 includes the method of Example 4, wherein implementing the second algorithm on the selected subset of bins comprises: implementing the second algorithm on the early bin, the initial-leading-edge bin, the first-late bin, and the second-late bin to determine the power ratio between the initial-leading-edge bin, and the early bin, the first-late bin, and the second-late bin to determine the interpolated bin number within the early bin, the next-leading-edge bin, the first-late bin, and the second-late bin.

Example 6 includes the method of any of Examples 4-5, further comprising: determining which of the early bin, the initial-leading-edge bin, the first-late bin, and the second-late bin has a highest power value; setting the power value of the bin with the highest power value as a peak power value; wherein implementing the second algorithm on the selected subset of bins comprises: computing an antilog of the power ratio of the early bin, the initial-leading-edge bin, the first-late bin, and the second-late bin each normalized relative to the peak power value to determine a power ratio value for the early bin, the initial-leading-edge bin, the first-late bin, and the second-late bin; summing the power ratio values of the early bin, the initial-leading-edge bin, the first-late bin, and the second-late bin to form a sum of the power ratio values; forming a normalized power ratio for the early bin, the initial-leading-edge bin, the first-late bin, and the second-late bin; forming a normalized scaled value for the early bin, the initial-leading-edge bin, the first-late bin, and the second-late bin by multiplying a bin number for the respective one of the selected bins by the normalized power ratio for the respective one of the selected bins; and summing the normalized scaled value for the early bin, the initial-leading-edge bin, the first-late bin, and the second-late bin to obtain an interpolated bin number within the early bin, the initial-leading-edge bin, the first-late bin, and the second-late bin.

Example 7 includes the method of Example 6, wherein determining the approximate distance to the target based on the interpolated bin number within the selected subset of bins comprises multiplying the interpolated bin number by a distance-factor per bin to determine the distance to the target.

Example 8 includes the method of Example 7, wherein after the distance to the target is determined based on the selected subset of bins including the initial-leading-edge bin, the method further comprises: updating the preselected number of the most recently generated sets of FFT bins.

Example 9 includes the method of any of Examples 7-8, wherein after the distance to the target is determined based on the selected subset of bins including the initial-leading-edge bin, the method further comprises: removing an oldest set of FFT bins from the preselected number of most recently generated sets of FFT bins; and inputting a most recently received set of FFT bins to the preselected number of most recently generated sets of FFT bins.

Example 10 includes the method of Example 9, wherein selecting the subset of bins from the at least one set of FFT bins further comprises: implementing the leading-edge-tracking algorithm to select a next-leading-edge bin in the most recently received set of FFT bins; selecting a bin preceding the next-leading-edge bin to be the early bin in the subset of bins; selecting a bin following the next-leading-edge bin to be the first-late bin in the subset of bins; and selecting a bin following the first-late bin to be the second-late bin in the subset of bins.

Example 11 includes the method of Example 10, further comprising: implementing the second algorithm on the early bin, the next-leading-edge bin, the first-late bin, and the second-late bin to determine the power ratio between the next leading edge tracked bin and the early bin, the first-late bin, and the second-late bin to determine the interpolated bin number within early bin, the next-leading-edge bin, the first-late bin, and the second-late bin.

Example 12 includes the method of any of Examples 1-11, wherein selecting the subset of bins from the averaged sets of FFT bins comprises: selecting four bins from forty averaged sets of FFT bins, the four bins including an early bin, a tracked bin adjacent to the early bin and at a larger bin number than the early bin, a first-late bin adjacent to the tracked bin, and a second-late bin adjacent to the first-late bin and at a larger bin number than the first-late bin.

Example 13 includes the method of any of Examples 1-12, further comprising: periodically ramping the FMCW radar signal from a first frequency to a second frequency.

Example 14 includes the method of any of Examples 1-13, further comprising: receiving the reflection of the ramped FMCW radar signal.

Example 15 includes a radar altimeter system with improved height measurement resolution comprising: a radar system including: a transmitter to generate and transmit a periodically ramped frequency modulated continuous wave (FMCW) radar signal from at least one antenna; a receiver to receive a reflection of the FMCW radar signal; and a processing system including: a fast Fourier transform (FFT) processor to periodically generate a set of fast Fourier transform (FFT) bins across a frequency range based on the received reflection of the FMCW radar signal, wherein the sets of FFT bins are indicative of a respective plurality of distances; at least one processor configured to: select a subset of bins from at least one set of FFT bins by implementing a leading-edge-tracking algorithm, wherein the bins in the selected subset of bins are adjacent to each other, and wherein the selected subset of bins are indicative of a respective plurality of approximate distances between the radar system and a target; implement a second algorithm on the selected subset of bins to determine a power ratio between the leading edge tracked bin and the remaining bins in the selected subset of bins to determine an interpolated bin number within the selected subset of bins; and determine an approximate distance to the target based on the interpolated bin number within the selected subset of bins.

Example 16 includes the radar altimeter system of Example 15, wherein the at least one processor configured to select the subset of bins from the at least one set of FFT bins is configured to: implement the leading-edge-tracking algorithm to select an initial-leading-edge bin; and average power values in respective bins in a preselected number of most recently generated sets of FFT bins to form an averaged set of FFT bins, wherein the at least one processor configured to select the subset of bins from the averaged set of FFT bins is further configured to: select a bin preceding the initial-leading-edge bin to be an early bin in the subset of bins; select a bin following the initial-leading-edge bin to be a first-late bin in the subset of bins; and select a bin following the first-late bin to be a second-late bin in the subset of bins.

Example 17 includes the radar altimeter system of Example 16, wherein the at least one processor configured to implement the second algorithm on the selected subset of bins to determine the power ratio between the leading edge tracked bin and the remaining bins in the selected subset of bins to determine the interpolated bin number within the selected subset of bins is configured to: normalize and scale the power values in the early bin, the initial-leading-edge bin, the first-late bin, and the second-late bin; and sum the normalized scaled values for the early bin, the initial-leading-edge bin, the first-late bin, and the second-late bin to obtain the interpolated bin number within the early bin, the initial-leading-edge bin, the first-late bin, and the second-late bin.

Example 18 includes the radar altimeter system of Example 17, wherein after the distance to the target is determined based on the selected subset of bins including the initial-leading-edge bin, the at least one processor is further configured to: remove an oldest set of FFT bins from the preselected number of most recently generated sets of FFT bins; input a most recently received set of FFT bins to the preselected number of most recently generated sets of FFT bins; implement the leading-edge-tracking algorithm to select a next-leading-edge bin in the most recently received set of FFT bins; select a bin preceding the next-leading-edge bin to be the early bin in the subset of bins; select a bin following the next-leading-edge bin to be the first-late bin in the subset of bins; select a bin following the first-late bin to be the second-late bin in the subset of bins; wherein the at least one processor configured to implement the second algorithm on the selected subset of bins to determine the power ratio between the leading edge tracked bin and the remaining bins in the selected subset of bins to determine the interpolated bin number within the selected subset of bins is further configured to: normalize and scale the power values in the early bin, the next-leading-edge bin, the first-late bin, and the second-late bin, sum the normalized scaled values for the early bin, the next-leading-edge bin, the first-late bin, and the second-late bin to obtain an interpolated bin number of the selected subset of bins.

Example 19 includes a method of improving height measurement resolution for a radar system, the method comprising: periodically generating a set of fast Fourier transform (FFT) bins across a frequency range based on a periodic ramping of a frequency modulated continuous wave (FMCW) radar signal from a first frequency to a second frequency, wherein the periodically generated sets of FFT bins are indicative of a respective plurality of distances; selecting a subset of bins from at least one of the sets of FFT bins by implementing a leading-edge-tracking algorithm by at least one processor, wherein the bins in the selected subset of bins are adjacent to each other, and wherein the selected subset of bins are indicative of a respective plurality of approximate distances between the radar system and a target; calculating a normalized scaled value for each of the selected bins; summing the normalized scaled value for the selected bins to obtain an interpolated bin number of the selected subset of bins; multiplying the interpolated bin number by a distance-factor per bin to determine the distance to the target.

Example 20 includes the method of Example 19, further comprising: implementing the leading-edge-tracking algorithm to select an initial-leading-edge bin; averaging power values in respective bins in a preselected number of most recently generated sets of FFT bins to form an averaged set of FFT bins, wherein selecting the subset of bins from at least one of the sets of FFT bins by implementing the leading-edge-tracking algorithm comprises selecting a bin preceding the initial-leading-edge bin to be the early bin in the subset of bins; selecting a bin following the initial-leading-edge bin to be a first-late bin in the subset of bins; selecting a bin following the first-late bin to be the second-late bin in the subset of bins, wherein after the distance to the target is determined based on the selected subset of bins including the initial-leading-edge bin, the method further comprises: removing an oldest set of FFT bins from the preselected number of most recently generated sets of FFT bins; inputting a most recently received set of FFT bins to the preselected number of most recently generated sets of FFT bins, and wherein selecting the subset of bins from the at least one set of FFT bins further comprises: implementing the leading-edge-tracking algorithm to select a next-leading-edge bin in the averaged set of FFT bins; selecting a bin preceding the next-leading-edge bin to be the early bin in the subset of bins; selecting a bin following the next-leading-edge bin to be the first-late bin in the subset of bins; and selecting a bin following the first-late bin to be the second-late bin in the subset of bins.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of improving height measurement resolution for a radar system, the method comprising:
periodically generating a set of fast Fourier transform (FFT) bins across a frequency range based on a periodic ramping of a frequency modulated continuous wave (FMCW) radar signal from a first frequency to a second frequency, wherein the sets of FFT bins are indicative of a respective plurality of distances;
selecting a subset of bins including a leading edge tracked bin from at least one set of FFT bins by implementing a leading-edge-tracking algorithm, wherein the bins in the selected subset of bins are adjacent to each other, and wherein the selected subset of bins is indicative of a respective plurality of approximate distances between the radar system and a target;
identifying the leading edge tracked bin in the selected subset of bins;
implementing a second algorithm on the selected subset of bins to determine a power ratio between the leading edge tracked bin and remaining bins in the selected subset of bins to determine an interpolated bin number within the selected subset of bins; and
determining an approximate distance to the target based on the interpolated bin number within the selected subset of bins.

2. The method of claim 1, wherein selecting the subset of bins from the at least one set of FFT bins comprises:
implementing the leading-edge-tracking algorithm to select an initial-leading-edge bin, and the method further comprises:
averaging power values in respective bins in a preselected number of most recently generated sets of FFT bins to form an averaged set of FFT bins.

3. The method of claim 2, wherein averaging the power values in the respective bins in the preselected number of most recently generated sets of FFT bins to form the averaged set of FFT bins comprises:
averaging the power values in bins in forty most recently generated sets of FFT bins to form the averaged set of FFT bins; and
wherein selecting the subset of bins from the at least one set of FFT bins comprises:
selecting a subset of four bins from the averaged set of FFT bins.

4. The method of claim 2, wherein selecting the subset of bins from the at least one set of FFT bins further comprises:
selecting a bin preceding the initial-leading-edge bin to be an early bin in the subset of bins;
selecting a bin following the initial-leading-edge bin to be a first-late bin in the subset of bins; and
selecting a bin following the first-late bin to be a second-late bin in the subset of bins.

5. The method of claim 4, wherein implementing the second algorithm on the selected subset of bins comprises:
implementing the second algorithm on the early bin, the initial-leading-edge bin, the first-late bin, and the second-late bin to determine the power ratio between the initial-leading-edge bin, and the early bin, the first-late bin, and the second-late bin to determine the interpolated bin number within the early bin, the next-leading-edge bin, the first-late bin, and the second-late bin.

6. The method of claim 4, further comprising:
determining which of the early bin, the initial-leading-edge bin, the first-late bin, and the second-late bin has a highest power value;
setting the power value of the bin with the highest power value as a peak power value;
wherein implementing the second algorithm on the selected subset of bins comprises:
computing an antilog of the power ratio of the early bin, the initial-leading-edge bin, the first-late bin, and the second-late bin each normalized relative to the peak power value to determine a power ratio value for the early bin, the initial-leading-edge bin, the first-late bin, and the second-late bin;
summing the power ratio values of the early bin, the initial-leading-edge bin, the first-late bin, and the second-late bin to form a sum of the power ratio values;
forming a normalized power ratio for the early bin, the initial-leading-edge bin, the first-late bin, and the second-late bin;
forming a normalized scaled value for the early bin, the initial-leading-edge bin, the first-late bin, and the second-late bin by multiplying a bin number for the respective one of the selected bins by the normalized power ratio for the respective one of the selected bins; and
summing the normalized scaled value for the early bin, the initial-leading-edge bin, the first-late bin, and the second-late bin to obtain an interpolated bin number within the early bin, the initial-leading-edge bin, the first-late bin, and the second-late bin.

7. The method of claim 6, wherein determining the approximate distance to the target based on the interpolated bin number within the selected subset of bins comprises multiplying the interpolated bin number by a distance-factor per bin to determine the distance to the target.

8. The method of claim 7, wherein after the distance to the target is determined based on the selected subset of bins including the initial-leading-edge bin, the method further comprises:
updating the preselected number of the most recently generated sets of FFT bins.

9. The method of claim 7, wherein after the distance to the target is determined based on the selected subset of bins including the initial-leading-edge bin, the method further comprises:
removing an oldest set of FFT bins from the preselected number of most recently generated sets of FFT bins; and
inputting a most recently received set of FFT bins to the preselected number of most recently generated sets of FFT bins.

10. The method of claim 9, wherein selecting the subset of bins from the at least one set of FFT bins further comprises:
  implementing the leading-edge-tracking algorithm to select a next-leading-edge bin in the most recently received set of FFT bins;
  selecting a bin preceding the next-leading-edge bin to be the early bin in the subset of bins;
  selecting a bin following the next-leading-edge bin to be the first-late bin in the subset of bins; and
  selecting a bin following the first-late bin to be the second-late bin in the subset of bins.

11. The method of claim 10, further comprising:
  implementing the second algorithm on the early bin, the next-leading-edge bin, the first-late bin, and the second-late bin to determine the power ratio between the next leading edge tracked bin and the early bin, the first-late bin, and the second-late bin to determine the interpolated bin number within early bin, the next-leading-edge bin, the first-late bin, and the second-late bin.

12. The method of claim 1, wherein selecting the subset of bins from the averaged sets of FFT bins comprises:
  selecting four bins from forty averaged sets of FFT bins, the four bins including an early bin, a tracked bin adjacent to the early bin and at a larger bin number than the early bin, a first-late bin adjacent to the tracked bin, and a second-late bin adjacent to the first-late bin and at a larger bin number than the first-late bin.

13. The method of claim 1, further comprising:
  periodically ramping the FMCW radar signal from a first frequency to a second frequency.

14. The method of claim 1, further comprising:
  receiving a reflection of the ramped FMCW radar signal.

15. A radar altimeter system with improved height measurement resolution comprising:
  a radar system including:
    a transmitter to generate and transmit a periodically ramped frequency modulated continuous wave (FMCW) radar signal from at least one antenna;
    a receiver to receive a reflection of the FMCW radar signal; and
  a processing system, coupled to the radar system, including:
    a fast Fourier transform (FFT) processor to periodically generate a set of fast Fourier transform (FFT) bins across a frequency range based on the received reflection of the FMCW radar signal, wherein the sets of FFT bins are indicative of a respective plurality of distances;
    at least one processor configured to:
      select a subset of bins including a leading edge tracked bin from at least one set of FFT bins by implementing a leading-edge-tracking algorithm, wherein the bins in the selected subset of bins are adjacent to each other, and wherein the selected subset of bins is indicative of a respective plurality of approximate distances between the radar system and a target;
      identifying the leading edge tracked bin;
      implement a second algorithm on the selected subset of bins to determine a power ratio between the leading edge tracked bin and remaining bins in the selected subset of bins to determine an interpolated bin number within the selected subset of bins; and
      determine an approximate distance to the target based on the interpolated bin number within the selected subset of bins.

16. The radar altimeter system of claim 15, wherein the at least one processor configured to select the subset of bins from the at least one set of FFT bins is configured to:
  implement the leading-edge-tracking algorithm to select an initial-leading-edge bin; and
  average power values in respective bins in a preselected number of most recently generated sets of FFT bins to form an averaged set of FFT bins,
  wherein the at least one processor configured to select the subset of bins from the averaged set of FFT bins is further configured to:
  select a bin preceding the initial-leading-edge bin to be an early bin in the subset of bins;
  select a bin following the initial-leading-edge bin to be a first-late bin in the subset of bins; and
  select a bin following the first-late bin to be a second-late bin in the subset of bins.

17. The radar altimeter system of claim 16, wherein the at least one processor configured to implement the second algorithm on the selected subset of bins to determine the power ratio between the leading edge tracked bin and the remaining bins in the selected subset of bins to determine the interpolated bin number within the selected subset of bins is configured to:
  normalize and scale the power values in the early bin, the initial-leading-edge bin, the first-late bin, and the second-late bin; and
  sum the normalized scaled values for the early bin, the initial-leading-edge bin, the first-late bin, and the second-late bin to obtain the interpolated bin number within the early bin, the initial-leading-edge bin, the first-late bin, and the second-late bin.

18. The radar altimeter system of claim 17, wherein after the distance to the target is determined based on the selected subset of bins including the initial-leading-edge bin, the at least one processor is further configured to:
  remove an oldest set of FFT bins from the preselected number of most recently generated sets of FFT bins;
  input a most recently received set of FFT bins to the preselected number of most recently generated sets of FFT bins;
  implement the leading-edge-tracking algorithm to select a next-leading-edge bin in the most recently received set of FFT bins;
  select a bin preceding the next-leading-edge bin to be the early bin in the subset of bins;
  select a bin following the next-leading-edge bin to be the first-late bin in the subset of bins;
  select a bin following the first-late bin to be the second-late bin in the subset of bins;
  wherein the at least one processor configured to implement the second algorithm on the selected subset of bins to determine the power ratio between the leading edge tracked bin and the remaining bins in the selected subset of bins to determine the interpolated bin number within the selected subset of bins is further configured to:
  normalize and scale the power values in the early bin, the next-leading-edge bin, the first-late bin, and the second-late bin,
  sum the normalized scaled values for the early bin, the next-leading-edge bin, the first-late bin, and the second-late bin to obtain an interpolated bin number of the selected subset of bins.

19. A method of improving height measurement resolution for a radar system, the method comprising:
- periodically generating a set of fast Fourier transform (FFT) bins across a frequency range based on a periodic ramping of a frequency modulated continuous wave (FMCW) radar signal from a first frequency to a second frequency, wherein the periodically generated sets of FFT bins are indicative of a respective plurality of distances;
- selecting a subset of bins from at least one of the sets of FFT bins by implementing a leading-edge-tracking algorithm, wherein the bins in the selected subset of bins are adjacent to each other, and wherein the selected subset of bins is indicative of a respective plurality of approximate distances between the radar system and a target;
- calculating a normalized scaled value for each of the selected bins;
- summing the normalized scaled value for the selected bins to obtain an interpolated bin number of the selected subset of bins; and
- multiplying the interpolated bin number by a distance-factor per bin to determine the distance to the target.

20. The method of claim 19, further comprising:
- implementing the leading-edge-tracking algorithm to select an initial-leading-edge bin;
- averaging power values in respective bins in a preselected number of most recently generated sets of FFT bins to form an averaged set of FFT bins, wherein selecting the subset of bins from at least one of the sets of FFT bins by implementing the leading-edge-tracking algorithm comprises
- selecting a bin preceding the initial-leading-edge bin to be the early bin in the subset of bins;
- selecting a bin following the initial-leading-edge bin to be a first-late bin in the subset of bins;
- selecting a bin following the first-late bin to be the second-late bin in the subset of bins, wherein after the distance to the target is determined based on the selected subset of bins including the initial-leading-edge bin, the method further comprises:
- removing an oldest set of FFT bins from the preselected number of most recently generated sets of FFT bins;
- inputting a most recently received set of FFT bins to the preselected number of most recently generated sets of FFT bins, and wherein selecting the subset of bins from the at least one set of FFT bins further comprises:
- implementing the leading-edge-tracking algorithm to select a next-leading-edge bin in the averaged set of FFT bins;
- selecting a bin preceding the next-leading-edge bin to be the early bin in the subset of bins;
- selecting a bin following the next-leading-edge bin to be the first-late bin in the subset of bins; and
- selecting a bin following the first-late bin to be the second-late bin in the subset of bins.

* * * * *